(12) United States Patent
Cherukuri et al.

(10) Patent No.: US 7,844,767 B2
(45) Date of Patent: Nov. 30, 2010

(54) METHOD FOR IDENTIFYING BAD LANES AND EXCHANGING WIDTH CAPABILITIES OF TWO CSI AGENTS CONNECTED ACROSS A LINK

(75) Inventors: Naveen Cherukuri, San Jose, CA (US); Sanjay Dabral, Palo Alto, CA (US); David S. Dunning, Portland, OR (US); Tim Frodsham, Portland, OR (US); Theodore Z. Schoenborn, Portland, OR (US); Rahul R. Shah, Marlborough, MA (US); Maurice B. Steinman, Marlborough, MA (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 10/851,925

(22) Filed: May 21, 2004

(65) Prior Publication Data

US 2005/0262284 A1 Nov. 24, 2005

(51) Int. Cl.
 *G06F 13/42* (2006.01)
 *G06F 13/14* (2006.01)
 *G06F 11/00* (2006.01)

(52) U.S. Cl. .......................... 710/106; 710/305; 714/3; 714/43

(58) Field of Classification Search ................ 710/41, 710/100, 107, 110, 129, 307, 310, 316, 38, 710/106, 305; 326/41; 713/324; 714/43, 714/3; 711/118; 439/894
See application file for complete search history.

(56) References Cited

U.S. PATENT DOCUMENTS

| | | | | |
|---|---|---|---|---|
| 4,667,305 A | * | 5/1987 | Dill et al. .................... | 710/307 |
| 5,280,598 A | * | 1/1994 | Osaki et al. .................. | 710/310 |
| 5,394,528 A | * | 2/1995 | Kobayashi et al. .......... | 710/307 |
| 5,613,078 A | * | 3/1997 | Kishigami .................... | 710/307 |
| 5,761,455 A | * | 6/1998 | King et al. .................... | 710/316 |
| 5,901,332 A | * | 5/1999 | Gephardt et al. .............. | 710/41 |
| 5,911,053 A | * | 6/1999 | Pawlowski et al. .......... | 710/307 |

(Continued)

FOREIGN PATENT DOCUMENTS

CN 1481633 3/2004

(Continued)

OTHER PUBLICATIONS

"Initiatives and Technologies: PCI Express Provides Enterprise Reliability, Availability, and Serviceability", PCI Express Technology, Intel Corporation, 2003, pp. 4-7.

(Continued)

*Primary Examiner*—Thomas J Cleary
(74) *Attorney, Agent, or Firm*—Blakely, Sokoloff, Taylor & Zafman LLP

(57) ABSTRACT

A technique is described by which two link agents with ports coupled together using a point-to-point interconnect in a system exchange their link width support capabilities and negotiate a link width that is mutually agreeable. The interconnect between each pair of agents comprises a pair of uni-directional links having multiple electrical wires, or lanes, where one link is used by a first agent to transmit data to a second agent and another link is used by the second agent to transmit data to the first agent.

27 Claims, 7 Drawing Sheets

U.S. PATENT DOCUMENTS

| | | | | |
|---|---|---|---|---|
| 5,913,044 | A * | 6/1999 | Tran et al. | 710/107 |
| 6,009,488 | A | 12/1999 | Kavipurapu | |
| 6,018,810 | A * | 1/2000 | Olarig | 714/43 |
| 6,047,348 | A * | 4/2000 | Lentz et al. | 710/307 |
| 6,223,237 | B1 * | 4/2001 | McDermid | 710/307 |
| 6,223,253 | B1 * | 4/2001 | Pawlowski | 711/118 |
| 6,434,654 | B1 * | 8/2002 | Story et al. | 710/307 |
| 6,442,628 | B1 | 8/2002 | Bastiani et al. | |
| 6,487,617 | B1 * | 11/2002 | Gates | 710/100 |
| 6,526,469 | B1 | 2/2003 | Drehmel et al. | |
| 6,581,116 | B1 * | 6/2003 | Arimilli et al. | 710/110 |
| 6,587,901 | B2 | 7/2003 | Nishikawa et al. | 710/100 |
| 6,617,877 | B1 * | 9/2003 | Cory et al. | 326/41 |
| 6,662,302 | B1 * | 12/2003 | Garey | 713/324 |
| 6,665,742 | B2 | 12/2003 | Owen et al. | |
| 6,842,818 | B2 * | 1/2005 | Okamoto et al. | 710/307 |
| 6,961,347 | B1 * | 11/2005 | Bunton et al. | 370/465 |
| 7,136,953 | B1 * | 11/2006 | Bisson et al. | 710/307 |
| 2001/0034805 | A1 * | 10/2001 | Usui et al. | 710/129 |
| 2002/0103945 | A1 * | 8/2002 | Owen et al. | 710/10 |
| 2004/0137805 | A1 * | 7/2004 | Mylly et al. | 439/894 |
| 2005/0259696 | A1 | 11/2005 | Steinman et al. | |

FOREIGN PATENT DOCUMENTS

| | | |
|---|---|---|
| EP | 0713307 A | 5/1996 |
| JP | 2002-540528 | 11/2002 |
| WO | WO 02/49306 A2 | 6/2002 |
| WO | WO 2004/036814 A1 | 4/2004 |

OTHER PUBLICATIONS

Bhatt, Ajay V., "Creating a Third Generation I/O Interconnect", Technology and Research Labs, Intel Corporation, 2002, pp. 1-8.

* cited by examiner

METHOD FOR IDENTIFYING BAD LANES AND EXCHANGING WIDTH CAPABILITIES OF TWO CSI AGENTS CONNECTED ACROSS A LINK

FIELD OF THE INVENTION

The present invention relates to the field of link-based computing stages; more particularly, the present invention relates to coordinating link width capabilities between agents connected across a link.

BACKGROUND OF THE INVENTION

FIG. 1 shows a prior art bus 120. A bus 120 is a "shared medium" communication structure that is used to transport communications between electronic components 101a-10Na and 110a, where N is an integer. Shared medium means that the components 101a-10Na and 110a that communicate with one another physically share and are connected to the same electronic wiring 120. That is, wiring 120 is a shared resource that is used by any of components 101a-10Na and 110a to communicate with any other of components 101a-10Na and 110a. For example, if component 101a wished to communicate to component 10Na, component 101a would send information along wiring 120 to component 10Na; if component 103 wished to communicate to component 110a, component 103a would send information along the same wiring 120 to component to component 110a, etc.

Computing systems have traditionally made use of busses. For example, with respect to certain IBM compatible PCs, bus 120 corresponds to a PCI bus where components 101a-10Na correspond to "I/O" components (e.g., LAN networking adapter cards, MODEMS, hard disk storage devices, etc.) and component 110a corresponds to an I/O Control Hub (ICH). As another example, with respect to certain multiprocessor computing systems, bus 120 corresponds to a "front side" bus where components 101a-10Na correspond to microprocessors and component 110a corresponds to a chipset.

Owing to an artifact referred to as "capacitive loading", busses are less and less practical as computing system speeds grow. Basically, as the capacitive loading of any wiring increases, the maximum speed at which that wiring can transport information decreases. That is, there is an inverse relationship between a wiring's capacitive loading and that same wiring's speed. Each component that is added to a wire causes that wire's capacitive loading to grow. Thus, because buses typically couple multiple components, bus wiring 120 is typically regarded as being heavily loaded with capacitance.

Computing systems are migrating to a "link-based" component-to-component interconnection scheme. FIG. 2 shows a comparative example vis-à-vis FIG. 1. According to the approach of FIG. 2, computing system components 101b-10Nb and 110b are interconnected through a mesh 140 of high speed uni-directional point-to-point links $130_1$ through $130_N$. A pair of uni-directional links typically comprises a first unidirectional point-to-point link that transmits information in a first direction and a second unidirectional point-to-point link that transmits information is a second direction that is opposite that of the first direction. Because a unidirectional point-to-point link typically has a single endpoint, its capacitive loading is substantially less than that of a shared media bus.

Each point-to-point link can be constructed with copper or fiber optic cabling and appropriate drivers and receivers (e.g., single-ended or differential line drivers and receivers for copper based cables; and LASER or LED E/O transmitters and O/E receivers for fiber optic cables, etc.). Mesh 140 observed in FIG. 2 is simplistic in that each component is connected by a point-to-point link to every other component. In more complicated schemes, mesh 140 is a network having routing/switching nodes in order to transport information from a source component to a destination component. Depending on the implementation, the routing/switching function may be a stand-alone function within the mesh network or may be integrated into a substantive component of the computing system (e.g., processor, memory controller, I/O unit, etc.).

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
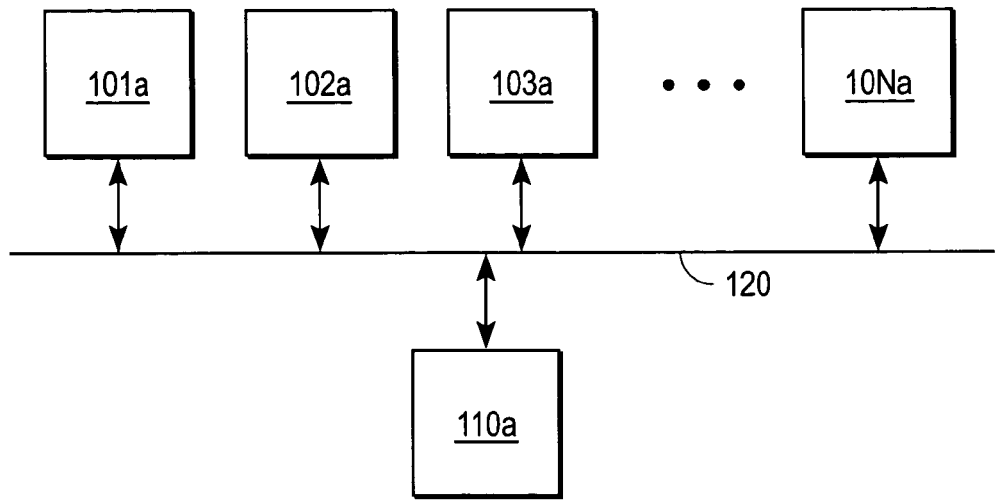
FIG. 1 shows components interconnected through a bus.
Figure 2:
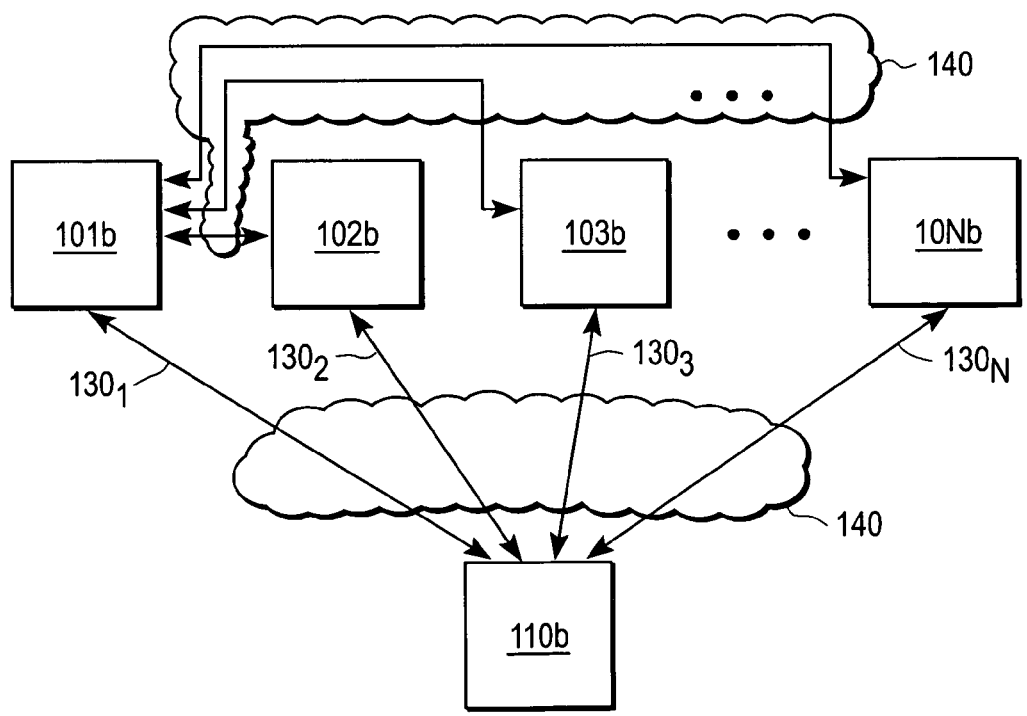
FIG. 2 shows components interconnected through a mesh of point-to-point links.

A technique is described by which two link agents with ports coupled together using a point-to-point interconnect in a system exchange their link width support capabilities and negotiate a link width that is mutually agreeable. The interconnect between each pair of agents comprises a pair of uni-directional links having multiple electrical wires, or lanes, where one link is used by a first agent to transmit data to a second agent and another link is used by the second agent to transmit data to the first agent. Each port of an agent may use all of the lanes (i.e., full link width) to transmit data to the port of the other agent or a subset of less than all of the lanes (e.g., half of the lanes (i.e., half width), a half of the half of the lanes (e.g., quarter width). In cases where less than all of the lanes are used to transmit data, there are a number of combinations, or sets, of lanes that may be used for transmitting data.

Because the two agents mutually agree on the lanes that are to be used, in, one embodiment of the technique, the receiver of the first agent that uses one uni-directional for the reception of data receives information from the transmitter of the second agent (coupled to the same link) specifying all (or a subset) of the combinations of lanes that the first agent's receiver is able to use to receive data from the second agent. The first agent sends information specifying these combinations using the first agent's transmitter that is coupled to the second agent via another uni-directional link. Note that the first agent's receiver may have knowledge of which lanes are not usable and therefore the combinations of lanes that the first agent's receiver is able to use to receive data may only include those lanes that are usable. In response to receiving this information, the second agent's transmitter selects one of the combinations of lanes and indicates the selection to the first agent's receiver by sending the indication over the uni-directional link that is coupling the second agent's transmitter to the first agent's receiver. In response to receiving the indication of the selection from the second agent's transmitter, the selected combination of lanes is used to transmit data to the first agent's receiver.

In one embodiment, an agent sends the information indicative of which combinations of lanes the agent desires to use to the other agent across each usable lane of the link between the two agents. Thus, the transmitter of one agent sends the same information serially across each usable lane of the link to a receiver of the other agent. This ensures that the receiver of the other agent receives the information, which is beneficial in system implementations in which the transmitter of the agent sending the selection information is not aware of what information was received by the receiver of the agent to which it is transferring information. Note also parallel transmission of the information may not be possible at this point because all of the lanes may not be usable.

Each of the agents may be coupled to one or more other agents through using separate and distinct pairs of point-to-point links. Accordingly, each agent may exchange their link width support capabilities and may negotiate a link width with multiple agents for the interconnects that connect the agent to the multiple agents.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 3:
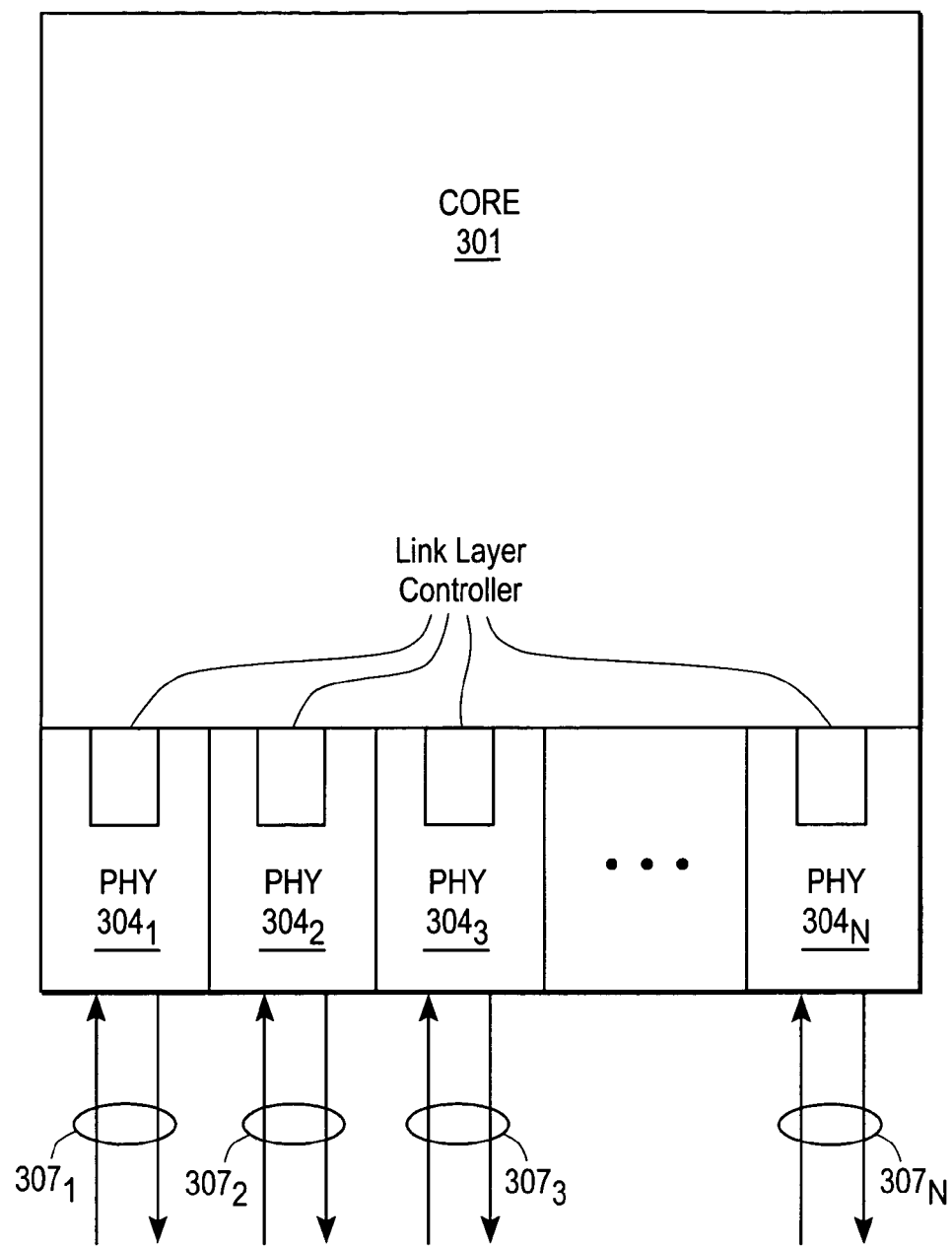
FIG. 3 illustrates one embodiment of an agent in a link-based computing system having multiple ports.

FIG. 3 shows an agent 300 in a link based computing system (e.g., a processing core, a memory controller, an I/O controller, etc.). Multiple uni-directional links $307_1$ through $307_N$ are shown coupled to agent 300. The pair of uni-directional links may be coupled to other components (not shown in FIG. 3) within the link-based computing system. Agent 300 can be viewed as having at least two sub-components: 1) a "core"; and 2) a physical layer comprising sourcepoints/endpoints (e.g., drivers/receivers) for the pair of uni-directional links 304.

Core 301 can be viewed as the component's primary functionality (e.g., the circuitry used to perform processing if the component is a processing core; the circuitry used to perform memory controller functions if the component is a memory controller or a portion of a chipset, etc.). Physical layer 304 is the circuitry used to prepare data for and transmit data over the outbound links. The physical layer 304 also includes the circuitry used to receive data from the inbound links and prepare the received data for presentation to core 301.

Each region of circuitry used for preparing data for transmission over a particular outbound link and for preparing data for presentation to core 301 after reception from a particular inbound link can be viewed as a separate region of physical layer 304. FIG. 3 shows N such regions $304_1$ through $304_N$.

Figure 4:
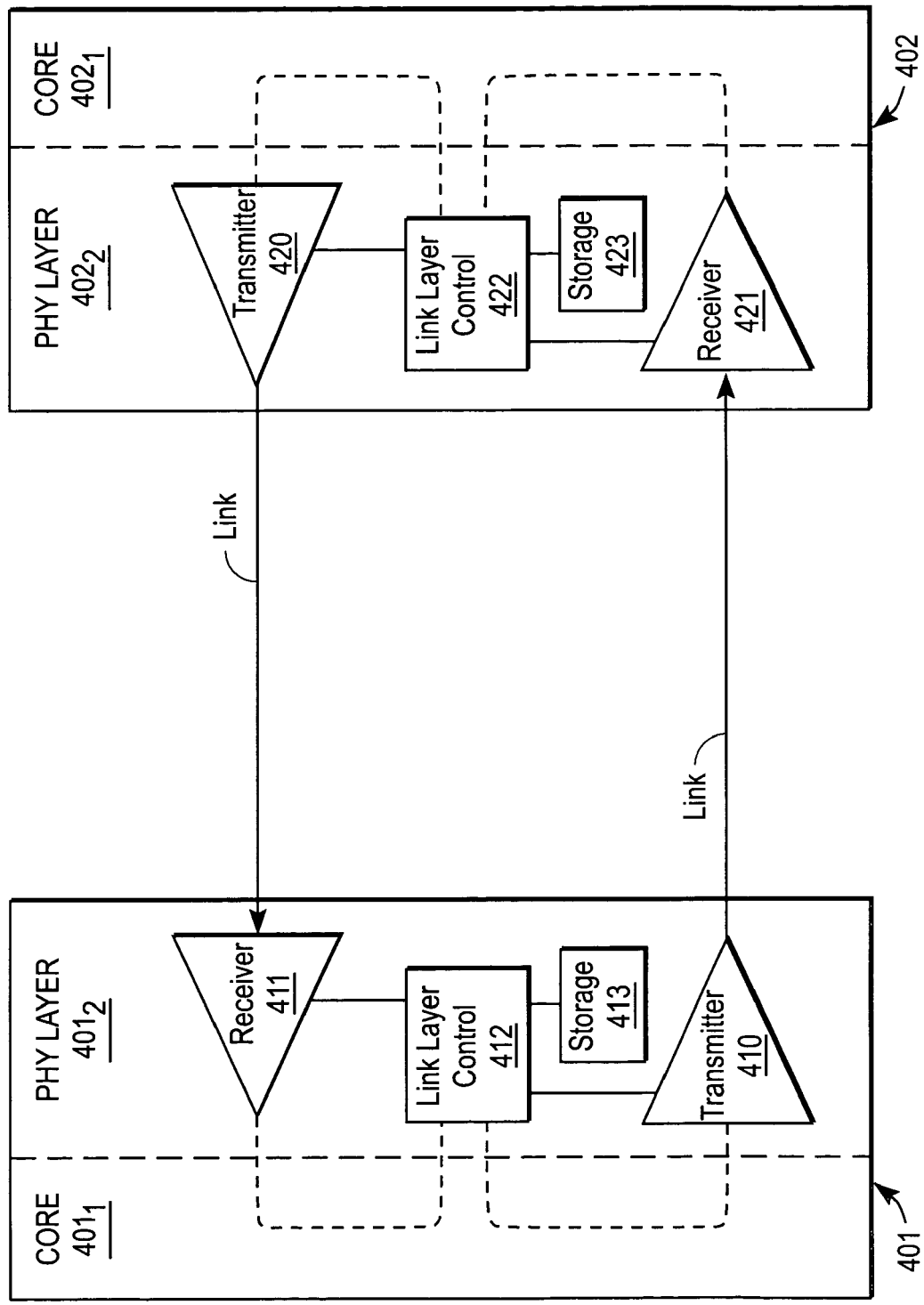
FIG. 4 illustrates a pair of agents in a link-based computing system with ports connected.

FIG. 4 illustrates a pair of agents 401 and 402. Each of agents 401 and 402 have a core, core $401_1$ and $402_1$ respectively, and a physical layer, physical layer $401_2$ and $402_2$. The physical layer of each of agents 401 and 402 includes a transmitter, a receiver, and a link controller. Thus, physical layer $401_2$ includes transmitter 410, receiver 411, and link controller 412, while physical layer $402_2$ includes transmitter 420, receiver 421, and link controller 422. Alternatively, the link controller may be part of the core. The physical layer of each of agents 401 and 402 may also include storage, shown as storage 413 in agent 401 and storage 423 in agent 402, that may be used by the link layer controller to store link width capability information of one or more agents. More specifically, link layer controller 412 of agent 401 may store link width capability information of agent 402 in storage 413, and link layer controller 422 of agent 402 may store link width capability information of agent 401 in storage 423.

In one embodiment, the exchange of link width support capabilities and the subsequent negotiation of a link width in each direction of communication between the agents are performed as part of link initialization. In one embodiment, during link initialization, the receivers on each agent progressively assess the quality of each lane and weed out lanes that are deemed unusable. Towards the end of link initialization, each agent looks at the available set of good lanes and assesses the possible link widths that can be formed using these good lanes. The ability to form a usable link width using available set of lanes is design specific. Once agents compute their ability to form a link width, they exchange this information and negotiate a link width that is mutually agreeable. Thus, the receiver checks the lanes of the link it is coupled to and determines which are bad, the transmitter (coupled to a different link) then sends the Width Capability Indicator (WCI) on behalf of the receiver to the other agent, and then the transmitter of the other agent selects the link width for the link between itself and the other agent's receiver.

In one embodiment, a link may be formed using a combination of any 4 logical quadrants. These quadrants are referred to herein as Q0 through Q3. Each of the 4 logical quadrants is internally represented using a 4-bit field called a Link Map (LM). The link map may be stored in memory (e.g., scratch memory). The LSB of LM corresponds to quadrant Q0 and the MSB corresponds to quadrant Q3. A value of 1 for a bit position in LM indicates that the corresponding quadrant is active, and a value of 0 indicates that the corresponding quadrant is not a part of the link. Table 1 shows Link Map for Link widths supported using all possible quadrant combinations. Other representations are possible.

TABLE 1

Link Map for Supported Link Widths

| Link Width | Quadrants Used | Link Map | Link Mask Index |
|---|---|---|---|
| Full-width | {Q3, Q2, Q1, Q0} | 1111 | 0 |
| Half-width | {Q1, Q0} | 0011 | 1 |
|  | {Q2, Q0} | 0101 | 2 |
|  | {Q3, Q0} | 1001 | 3 |
|  | {Q2, Q1} | 0110 | 4 |
|  | {Q3, Q1} | 1010 | 5 |
|  | {Q3, Q2} | 1100 | 6 |
| Quarter-width | {Q0} | 0001 | 7 |
|  | {Q1} | 0010 | 8 |
|  | {Q2} | 0100 | 9 |
|  | {Q3} | 1000 | 10 |

As shown in Table 1, there are eleven possible ways of forming a valid link—a unique combination of quadrants to form a full-width link, six possible quadrant combinations to form a half-width link and four possible ways to form a quarter-width link. In one embodiment, an implementation is not required to support all these eleven possible combinations. The last column in Table 1 is used to index a Link Map.

In one embodiment, Link Maps supported by an implementation are represented using an 11-bit field referred to herein as the Width Capability Indicator (WCI). Each bit in WCI corresponds to one of the indices shown in Link Mask Index column of Table 1. Thus, bit 0 of WCI corresponds to index 0, bit 1 of WCI corresponds to index 1 and so on. In one embodiment, a value of 1 for a WCI bit indicates that an LM corresponding to this index can be used to form a link width. During link initialization, ports exchange their corresponding WCI, which is implementation specific, and agree on an LM that is common to both ports. The LM thus agreed upon is referred to as Common Link Map (CLM). In one embodiment, the order of precedence for selecting a CLM is from the lowest bit to the highest bit in WCI. For instance, if two ports supporting all LMs in Table 1 are configured to form a half-width link, they will use {Q1, Q0} to form a link as this quadrant combination has a lower bit position in WCI compared to all other half-width quadrant combinations. Other orders of precedence may be used.

Table 2 shows a few example implementations with widely varying link width support capabilities. The WCI fields for each of these examples is also shown. For instance, if two implementations show in Example 1 are configured to form a half-width link, they will use quadrants {Q1, Q0}, as this quadrant combination takes precedence over other half-width quadrant combinations. Conversely, if implementations shown in Examples 1 and 3 are connected together and configured to form a half-width link, a link initialization error occurs as these implementations do not have a common LM to support a half-width link.

TABLE 2

Examples of Width Capability Indicator (WCI)

| Example | Link Widths Supported | Width Capability Indicator (WCI) | | | | | | | | | | |
|---|---|---|---|---|---|---|---|---|---|---|---|---|
| | | 10 | 9 | 8 | 7 | 6 | 5 | 4 | 3 | 2 | 1 | 0 |
| 1 | Full-, half- and quarter-width using all possible quadrant combinations | 1 | 1 | 1 | 1 | 1 | 1 | 1 | 1 | 1 | 1 | 1 |
| 2 | Full-width, Half-width using only quadrants Q1 and Q0, and quarter-width using quadrant Q0 only | 0 | 0 | 0 | 1 | 0 | 0 | 0 | 0 | 0 | 1 | 1 |
| 3 | Full-width support only | 0 | 0 | 0 | 0 | 0 | 0 | 0 | 0 | 0 | 0 | 1 |

Once WCI are exchanged during link initialization (Configuration state), the CLM selected is returned as a part of an acknowledgement. As the WCI indicates full width capabilities of an agent for a given set of lanes, the link width negotiation process is done in a single pass.

Figure 5:
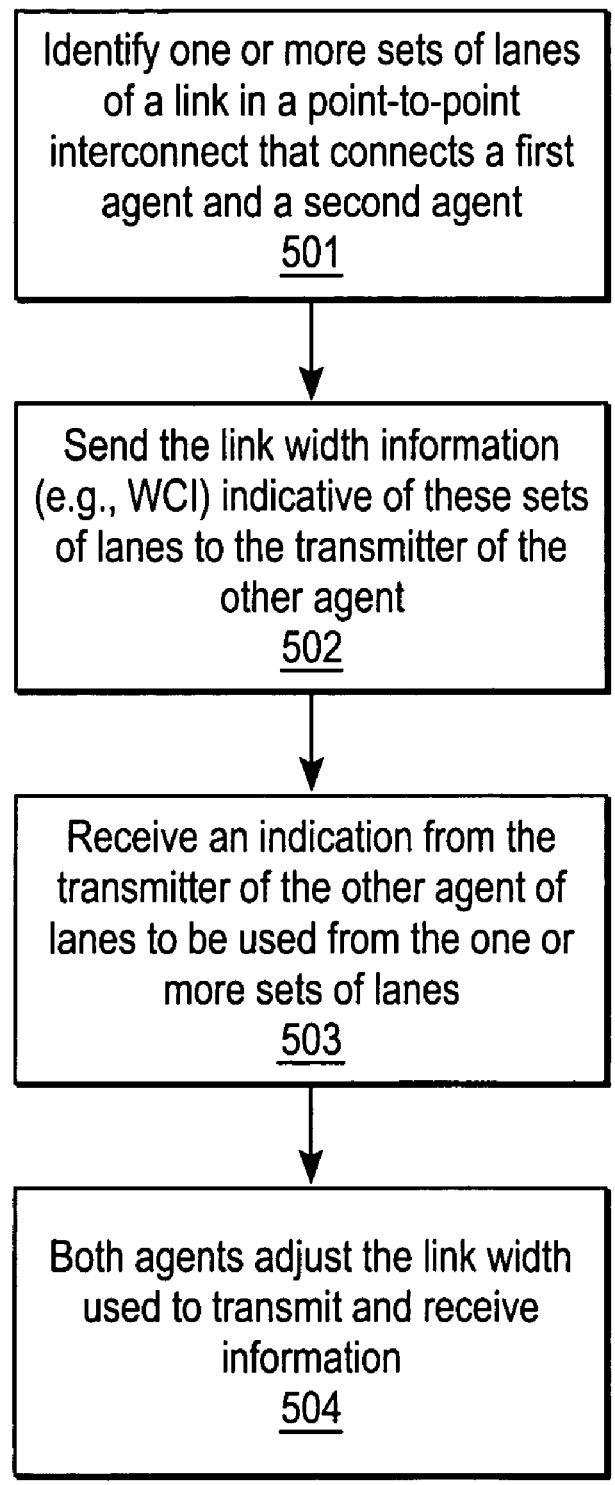
FIG. 5 is a flow diagram of one embodiment of the process performed by a transmitter in the physical layer of an agent.

FIG. 5 is a flow diagram of one embodiment of the process performed by a transmitter in the physical layer of an agent. The process is performed by processing logic that may comprise hardware (circuitry, dedicated logic, etc.), software (such as is run on a general purpose computer system or a dedicated machine), or a combination of both.

Referring to FIG. 5, the process begins by processing logic identifying one or more sets of lanes of a link in a point-to-point interconnect that connects a first agent and a second agent (processing block 501). The first agent uses the link to transmit information to the second agent. The processing logic of the second agent may identify the one of more sets of lanes of the link by accessing quality of each of the lanes and identifying whether each of the lanes is usable. Those lanes that are not functioning properly or cannot be trained properly (to compensate and adjust for the skew in the lane to ensure that the data window for all the lanes is aligned) would be considered failed and not usable.

After identifying sets of lanes of a link, processing logic of the second agent sends to the first agent the link width information (e.g., WCI) indicative of these sets of lanes to the first agent (processing block 502). The link width information comprises data that identifies the possible combinations of lanes that can be formed using the lanes that are deemed usable in the plurality of lanes by the receiver of the second agent. In one embodiment, the link width information is sent serially by the transmitter of the second agent (on behalf of the receiver of the second agent) on the lanes of another link that are usable (and thus selectable for use) to a receiver of the first agent, which forwards the information received to a link controller. The link width information is sent on all the lanes that are usable because the transmitter does not know what information is received by the receiver of the other agent.

Subsequently, processing logic receives an indication from the transmitter of the first agent of the lanes to be used from the one or more sets of lanes (processing block 503) and both the first and second agents adjust the link width used to transmit information (processing block 504). In one embodiment, this adjustment includes adjusting multiplexing logic responsible for coordinating the transfer of data onto the correct data lanes of the link. For example, multiplexing logic may be enabled to provide full width data to half of the lanes for half width or to one quarter of the lanes for quarter width, including the specification of which half or fourth of the lanes to use. An example of such multiplexing is described in U.S patent application Ser. No. 10/850,809, entitled "METHODS AND APPARATUSES TO EFFECT A VARIABLE-WIDTH LINK", concurrently filed and assigned to the corporate assignee of the present invention.

Figure 6:
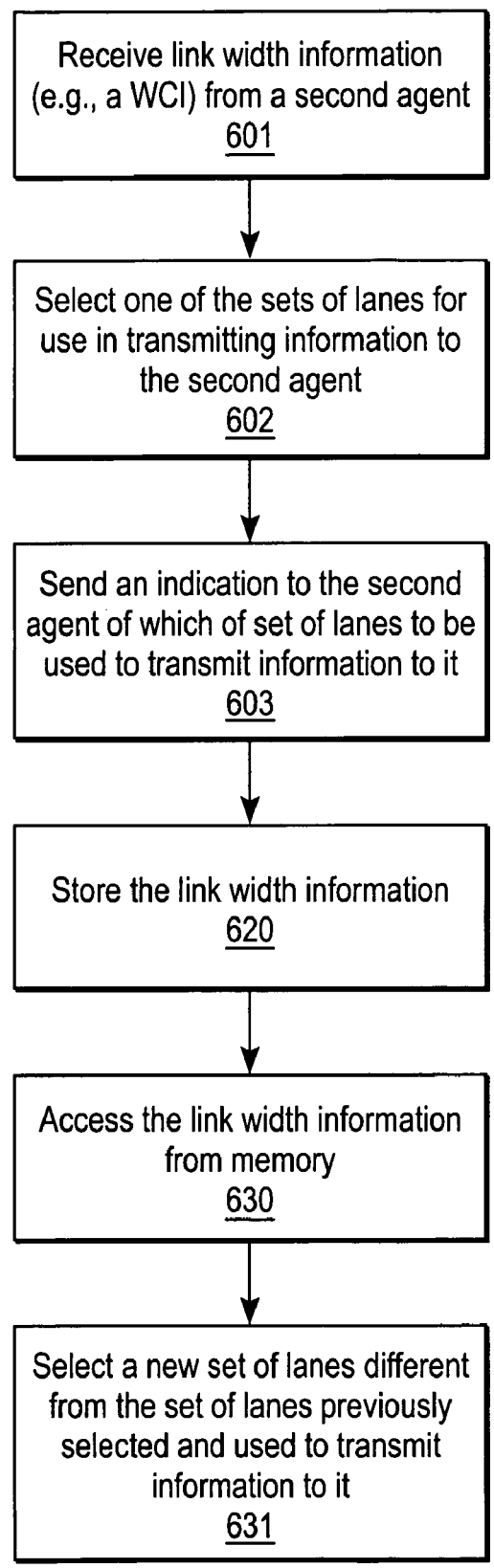
FIG. 6 is a flow diagram of one embodiment of the process performed by a receiver in the physical layer of an agent.

FIG. 6 is a flow diagram of one embodiment of the process performed by a receiver in the physical layer of an agent. The process is performed by processing logic that may comprise hardware (circuitry, dedicated logic, etc.), software (such as is run on a general purpose computer system or a dedicated machine), or a combination of both. The processing logic may reside in a first agent that receives information over a link from a second agent.

Referring to FIG. 6, the process begins by processing logic receiving link width information (e.g., a WCI) from a second agent (processing logic 601). The link width information indicates one or more sets, or combinations, of lanes of a link in a point-to-point interconnect that may be used by the second agent to receive information from the first agent. In one embodiment, the link width information includes multiple bits, with each of the bits being indicative of one combination of lanes of link identified as being usable by the receiving agent to receive information. In one embodiment, the link width information is received as serial data on one, more or all of the lanes of the link.

After receiving the link width information, processing logic selects one of the sets of lanes to be used in transmitting information to the second agent (processing block 602), and then processing logic sends an indication to the second agent of which of set of lanes is to be used to transmit information to it (processing block 603). In one embodiment, the processing logic sends the indication using another separate unidirectional link in the interconnect. Thereafter, both agents use the link width and the specific lanes selected by the transmitter of the first agent to transmit information to the receiver of the second agent. Thus, the negotiation and selection of the lanes to transfer data between the transmitting agent and the receiving agent connected to a link occurs in a single pass.

Note that the link width information may be stored by the first agent.

Figure 7:
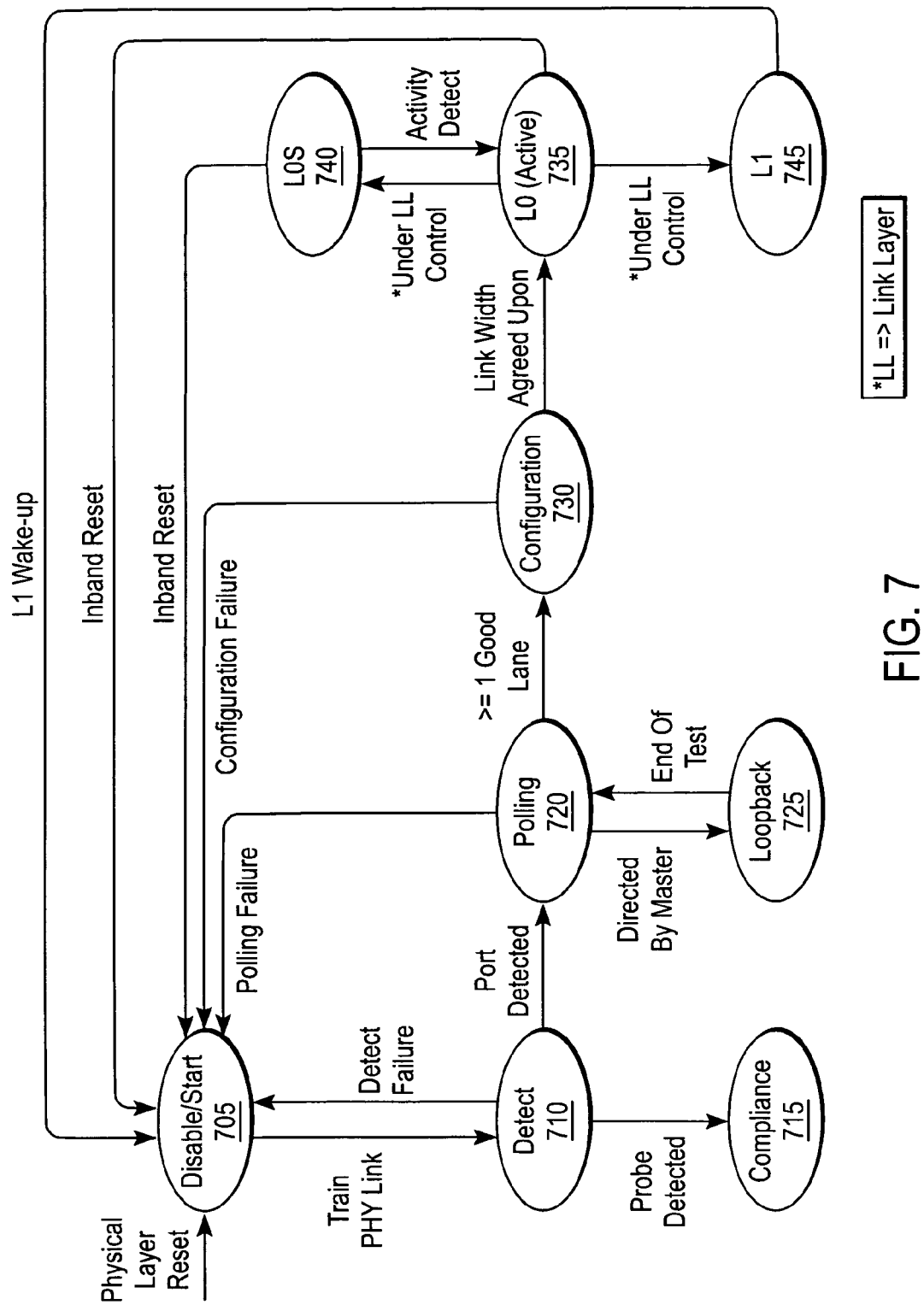
FIG. 7 illustrates a link initialization state diagram for one embodiment of a system having at least two agents.

FIG. 7 illustrates a link initialization state diagram for one embodiment of a system having at least two agents. Referring to FIG. 7, initially, both agents assume all lanes are good. Initialization proceeds by training each lane to bit lock. In one embodiment, a portion of logic is used to effect link training or calibration. The training logic allows the physical layer on each side of the link to be calibrated in order to begin using the link. That is, the internal semiconductor devices are calibrated to be compatible with the I/O link. The initial calibration procedure is referred to herein as initialization of the physical layer. This initialization is effected in a sequence of stages with the initialization of each subsequent stage requiring the training of I/O circuitry in a previous stage.

As the state machine transitions through each state, it identifies lanes that failed to train in that particular state. Bad lanes are identified by receiver portion of a port. All lanes thus identified are marked bad and will not be used as part of a link during transmission. Before the state machine advances to Configuration, it computes a local WCI using the available set of good lanes. This local WCI indicates the receiver's capabilities to receive incoming data at different link widths. In the configuration state, both agents exchange their WCI. The transmitters on each side compare the remote WCI, which corresponds to the remote receiver's capabilities, with the capabilities of the local transmitter's WCI. The transmitter's WCI may be stored or computed based on design characteristics of the computer system. As the transmitter is not involved in identifying bad lanes, the transmitter's WCI does not factor in the existence of lanes that failed to train during initialization. However, the transmitter compares its WCI with the WCI of the receiver of the other agent (the remote WCI) connected to the link and selects a CLM that is common to both. Thus, the transmitter avoids selecting a LM containing bad lanes since this LM would not be a part of remote WCI. Once the transmitter selects a CLM, it transmits this CLM to the remote receiver, after which both the transmitter and the receiver use this CLM and enter the L0 state. Note that the CLM corresponds to a set of transceivers, and thus each direction of the link has its own CLM. It is allowed for these two CLMs to be different, and hence one direction of the link may operate at a width that is independent of link width in other direction. This ensures that lane failures in one direction do not degrade bandwidth in the other direction. Both directions of the link may operate with the same width, but use different combinations of lanes.

More specifically, the state machine of FIG. 7 controls a physical layer initialization of a link in which the physical layer is reset using reset in accordance with one embodiment of the invention. State machine 700, shown in FIG. 7, represents an initialization sequence starting with Disable/Start operation 705. The Disable/Start state 705 is entered at power-on or in response to any physical layer reset event. Upon starting, the port performs a Detect operation 710 to detect an interconnected agent. The Detect operation 710 is the point at which two agents are synchronized to commence link initialization. The Detect operation 710 determines if there is another physical layer agent (i.e., the physical layer of another agent) at the other end of the link. Alternative embodiments of the invention provide a PLI that can distinguish between detection of an interconnected agent and a test probe.

In Detect operation 710, the local port activates a forwarded clock and begins locking to the received clock from the remote port. If at the end of some specified time, the received clock is not detected, the local port abandons the initialization sequence and resets to operation Disable/Start 705. The Detect operation 710 then checks for a known DC pattern of the remote agent.

Upon detecting each other, the interconnected agents begin a Polling operation 720 to effect interactive training. During Polling operation 720, the link is trained to operate with the high-speed clock used to select between the two interconnected agents.

Upon completion of the Polling operation 720, a Configuration operation 730 is performed. During Configuration operation 730, information acquired during polling is used to configure the link. At this point, link initialization is complete and the link layer takes control of the port at state L0 735, (unless the local and remote ports cannot agree on a link configuration, in which case, the initialization sequence is abandoned and reset to operation Disable/Start 705).

The training sequence is being sent serially on each of the links and the transmitter is aware of the number of training sequences to send. However, the transmitter and the receiver are not necessarily in lock-step. In one embodiment, because the number of training sequences is not fixed, the received cannot know when the last training sequence from the transmitter will arrive. To address this situation, once the link width is agreed on, the transmit port sends a third training sequence. So, once the port has sent and received the last training sequence, link initialization is complete and the link layer takes control of the port at this point at state L0 7135. During initialization, training sequences are used and are transmitted sequentially on each of the lanes. After the active state is reached, a parallel model is used in which data are transmitted in parallel on all lanes.

The physical layer electronics are still active, but engaged in decomposing the flits on one side of the link and reconstructing them on the other side of the link. The physical layer is no longer involved in training and operates under the direction of the link layer in state L0 to transfer data across the link.

In one embodiment, the physical layer may enter a low-power mode. As shown in FIG. 7, state machine 700 also includes two low power states L0S 740 and L1 745. The low power modes are used to save power when the system will be dormant for some time. Each low-power mode has a predetermined reactivation time (wake-up time). L0S 740 has a relatively short wake-up time (e.g., 20 ns) for relatively short dormancy periods. Therefore in L0S 740, less of the circuitry is turned off. L1 745 has a relatively longer wake-up time (e.g., 10 μs) for relatively longer dormancy periods. The low power mode used is dependent upon the expected dormancy pattern of the system.

As discussed above in reference to FIG. 7, a forwarded clock is sent, during the Detect operation 710 by the local agent, which then awaits a received clock from the remote port. A forwarded clock is an explicit clock signal transmitted along with the outgoing data on the physical interconnect using dedicated clock pins. The forwarded clock is sent during the Detect operation 710 and continues indefinitely. Using a forwarded clock, the local and remote agents each indicate to each other the clock signal they have received from the system clock. The forwarded clock allows each agent to know what clock signal they should use to receive data from the other. In one embodiment, an in-band reset is initiated by cessation of the forwarded clock. An in-band reset is used by the link layer to re-initialize the physical layer if the physical layer cannot recover from CRC errors beyond a specified retry threshold. In-band reset is also used to configure the physical layer by overriding power-on default values through soft reset. Additionally, the in-band reset can be used in response to a failure during the initialization of the physical layer to force the two interconnected agents to re-initialize the link.

Thus, the techniques described herein provide for link width negotiation as a one step process, and provide flexibility to enable agents to define their own link width support capabilities. Note that this scheme does not require, nor expect, link width capabilities of two connected agents to match.

Figure 8:
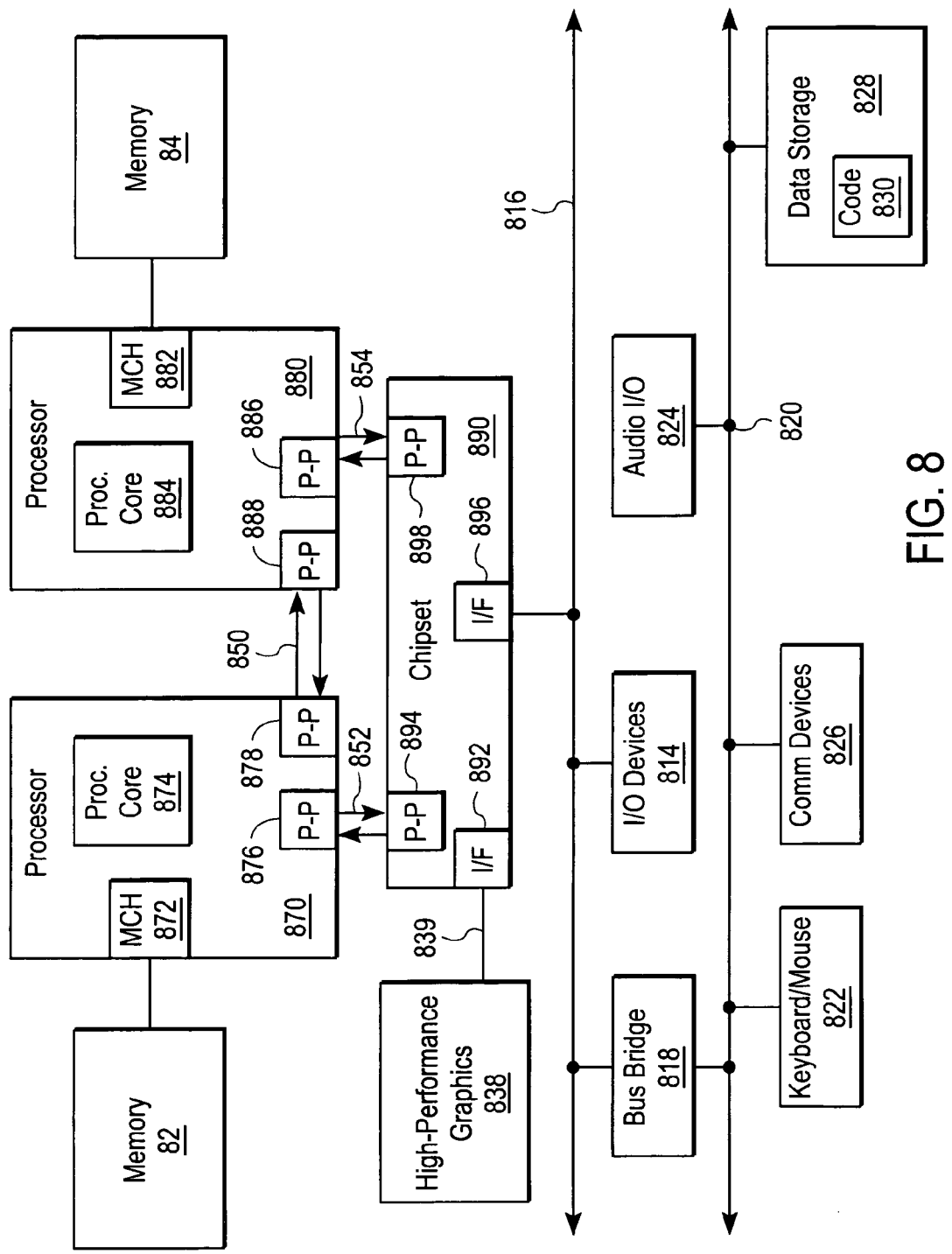
FIG. 8 is a block diagram of one embodiment of a computer system.

FIG. 8 illustrates a computer system that is arranged in a point-to-point (PtP) configuration. In particular, FIG. 8 shows a system where processors, memory, and input/output devices are interconnected by a number of point-to-point interfaces.

The FIG. 8 system may also include several processors, of which only two, processors 870 and 880 are shown for clarity. Processors 870 and 880 include a processor 874 and 884 that includes logic and circuitry to execute instructions. Processors 870 and 880 may each include a local memory controller hub (MCH) 872 and 882 to connect with memory 82 and 84, respectively. Processors 870 and 880 may exchange data via a point-to-point interface 850 using point-to-point interface circuits 878 and 888, respectively. Processors 870 and 880 may each exchange data with a chipset 890 via individual point-to-point interfaces 852 and 854, respectively, using point-to-point interface circuits 876 and 894 and 886 and 898, respectively. Chipset 890 may also exchange data with a high-performance graphics circuit 838 via a high-performance graphics interface 892.

At least one embodiment of the invention may be located within the memory controller hub 872 or 882 of the processors. Other embodiments of the invention, however, may exist in other circuits, logic units, or devices within the system of FIG. 8. Furthermore, other embodiments of the invention may be distributed throughout several circuits, logic units, or devices illustrated in FIG. 8.

Another bus 816 (e.g., a PCI bus) may be coupled to chipset 890. I/O devices 814 and a bus bridge 818 may be coupled to bus 816. Bus bridge 818 may be coupled to another bus 820 (e.g., an ISA bus). Other components coupled to bus 820 may include a keyboard/mouse 822, communication devices 826 and data storage 828 (which may store code 830, which when executed may cause one or more of the operations described herein to performed).

In one embodiment, each agent stores the WCI received from the remote agent and opportunistically uses this information for dynamic link width modulation for power savings. No link re-initialization is required for dynamic link width modulation. The transmitter selects a new CLM from the remote WCI and sends it to the receiver, after which both transmitter and receiver adjust their link widths to reflect this new CLM. This process is shown in FIG. 6.

More specifically, optionally, the process of FIG. 6 may include the following operations. Processing logic then stores the link width information (processing block 620). Subsequent to sending the indication of which set of lanes to use, processing logic accesses the link width information from memory (processing block 630) and selects a new set of lanes different from the set of lanes previously selected and used to transmit information to it (processing block 631). Once the new selection has been made, processing logic sends a new indication to the receiving agent to indicate the new set of lanes to be used to transmit information to the receiving agent. Thus, a new link width may be selected without having to subsequently receive additional link width information (e.g., another WCI) from the transmitting agent. In other words, techniques described herein supports dynamic link width modulation without link re-initialization.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

We claim:

1. A method comprising:
identifying one or more sets of lanes of a first plurality of lanes based on usability in a point-to-point interconnect, the point-to-point interconnect having a first link that comprises the first plurality of lanes for connecting a first agent to a second agent by which the second agent is able to transmit information to the second agent, wherein identifying the one or more sets of lanes includes assessing quality of each of the first plurality of lanes, identifying whether a lane of the first plurality of lanes is usable, and rejecting the lane of the first plurality of lanes if the lane is not usable;
sending a link width support capability information to the first agent, wherein the link width support capability information includes data identifying a set of link widths supported by possible combinations of the first plurality of lanes coupling the first agent and the second agent, wherein the link width support capability information includes a number of bit fields, wherein each of the number of bit fields indicates which link width of the set of link widths is supported by which combination of a number of the possible combinations of the first plurality of lanes based on the one or more sets of lanes to perform a link width negotiation process in a single pass;
receiving an indication from the first agent of a second plurality of lanes to use from the all possible combinations of lanes of the one or more sets of lanes; and
adjusting link width used by the first agent to transmit information and the second agent to receive based on the indication from the first agent.

2. The method defined in claim 1 wherein identifying one or more sets of lanes of a plurality of lanes comprises:
identifying lanes of the plurality of lanes that are usable; and
assessing possible combinations of lanes that can be formed using the lanes that are usable in the plurality of lanes; and wherein the link width support capability information comprises a data structure with data that identifies the possible combinations of lanes that can be formed using the lanes that are usable in the plurality of lanes.

3. The method defined in claim 1 wherein the link width support capability information is sent serially on lanes of the plurality of lanes.

4. The method defined in claim 3 wherein the link width support capability information is sent serially on all lanes of the plurality of lanes that may be selectable by the first agent for use by the first agent in sending information to the second agent.

5. The method defined in claim 1 wherein a transmitter of the second agent sends the link width support capability information on behalf of a receiver of the second agent to a receiver of the first agent.

6. The method defined in claim 5 wherein the transmitter of the second agent is unaware of whether the receiver of the first agent receives the link width support capability information on each of the plurality of lanes.

7. The method defined in claim 1 wherein the one or more sets of lanes includes sets having all of the plurality of lanes, one half of the plurality of lanes and one half of the one half of the plurality of lanes.

8. The method defined in claim 1 wherein each of the bit fields includes a bit indicative of whether a set of lanes of the first plurality of lanes has been identified as being usable by the second agent to receive information from the first agent.

9. The method defined in claim 1 wherein the operations of identifying, sending, and receiving occur in a single round trip of communication between the first and second agents.

10. A method comprising:
a first agent receiving a link width support capability information from a second agent that includes an indication of one or more sets of lanes based on usability of a first link in a point-to-point interconnect by which the second agent is able to receive information from the first agent, wherein the link width support capability information includes data identifying a set of link widths supported by possible combinations of the lanes coupling the first agent and the second agent, wherein the link width support capability information is determined based on identifying the one or more set of lanes that are usable that includes assessing quality of each of the lanes, identifying whether a lane of the lanes is usable, and rejecting the lane of the lanes if the lane is not usable, wherein the link width support capability information includes a number of bit fields, wherein each of the number of bit fields indicates which link width of the set of link widths is supported by which combination of a number of the possible combinations of the lanes based on the one or more sets of lanes to perform a link width negotiation process in a single pass;
selecting one of the sets of lanes for use by the first agent in transmitting information to the second agent, wherein the one of the sets of lanes is selected from the all possible combinations of lanes of the one or more sets of lanes that support the all possible sets of link widths; and
sending an indication to the second agent of which of the sets of lanes the second agent is to use to receive information from the first agent.

11. The method defined in claim 10 wherein the link width support capability information is received serially on lanes of the first link.

12. The method defined in claim 10 wherein receiving the link width support capability information from the second agent is performed using a second link in the interconnect.

13. The method defined in claim 10 wherein the one or more sets of lanes includes sets having all lanes of the link, one half of all lanes in the link and one half of the one half of all lanes in the link.

14. The method defined in claim 10 wherein each of the bit fields includes a bit indicative of whether a set of lanes of the link has been identified as being usable by the second agent to receive information from the first agent.

15. An apparatus comprising:
   a core;
   a receiver;
   a transmitter for communicably coupling to a first agent to send link width support capability information that includes an indication of one or more sets of lanes based on usability for use by the receiver to receive information from the first agent, wherein the link width support capability information includes data identifying a set of link widths supported by possible combinations of the lanes coupling the first agent and the second agent, wherein the link width support capability information is determined based on identifying the one or more set of lanes that are usable that includes assessing quality of each of the lanes, identifying whether a lane of the lanes is usable, and rejecting the lane of the lanes if the lane is not usable, wherein the link width support capability information includes a number of bit fields, wherein each of the number of bit fields indicates which link width of the set of link widths is supported by which combination of a number of the possible combinations of the lanes based on the one or more sets of lanes to perform a link width negotiation process in a single pass;
   wherein the receiver is operable to receive an indication from the first agent of a first plurality of lanes to use from the all possible combinations of lanes of the one or more sets of lanes that support the all possible sets of link widths; and
   a link layer controller coupled to the transmitter and the receiver to adjust link width of a link used by a second agent to receive information from the first agent based on the indication.

16. The apparatus defined in claim 15 wherein the link layer controller identifies lanes of the link that are usable and determines possible combinations of lanes that can be formed using the usable lanes of the link.

17. The apparatus defined in claim 15 wherein each of the bit fields includes a bit indicative of whether a set of lanes of the link has been identified as being usable to transmit information.

18. An apparatus comprising:
   a core;
   a receiver to receive link width support capability information from a first agent that includes an indication of one or more sets of lanes based on usability of a first link in a point-to-point interconnect by which the first agent is able to receive information, wherein the link width support capability information includes data identifying a set of link widths supported by possible combinations of the lanes that couple the first agent and the second agent, wherein the link width support capability information is determined based on identifying the one or more set of lanes that are usable that includes assessing quality of each of the lanes, identifying whether a lane of the lanes is usable, and rejecting the lane of the lanes if the lane is not usable, wherein the link width support capability information includes a number of bit fields, wherein each of the number of bit fields indicates which link width of the set of link widths is supported by which combination of a number of the possible combinations of the lanes based on the one or more sets of lanes to perform a link width negotiation process in a single pass;
   a link layer controller coupled to the receiver to select one of the sets of lanes for use in transmitting information to the first agent, wherein the one of the sets of lanes is selected from the all possible combinations of lanes of the one or more sets of lanes that support the possible sets of link widths; and
   a transmitter coupled to the link layer controller to send an indication to the first agent of which of the sets of lanes the first agent is to use to receive information.

19. The apparatus defined in claim 18 wherein each of the bit fields includes a bit indicative of whether a set of lanes of the link has been identified as being usable to transmit information.

20. A system comprising:
   a pair of uni-directional links, each having a plurality of lanes;
   first and second agents having ports coupled to the plurality of lanes in the pair of uni-directional links, each of the first and second agents including a link controller to exchange their link width support capabilities and negotiate a mutually agreeable link width for each of the pair of the plurality of lanes based on usability, wherein the link width support capabilities include an indication of one or more lanes of the plurality of lanes that are usable, and wherein the link width support capabilities of the first and second agents include data identifying a set of link widths supported by possible combinations of the lanes coupling the first agent and the second agent wherein the link width support capabilities of each of the first agent and the second agent is determined based on identifying the one or more set of lanes that are usable by assessing quality of each of the lanes, identifying whether a lane of the lanes is usable, and rejecting the lane of the lanes if the lane is not usable, wherein the link width support capability information includes a number of bit fields, wherein each of the number of bit fields indicates which link width of the set of link widths is supported by which combination of a number of the possible combinations of the lanes based on the one or more sets of lanes to perform a link width negotiation process in a single pass.

21. The system defined in claim 20 wherein the pair of uni-directional links transfer information in opposite directions and are independent of each other.

22. The system defined in claim 20 wherein the first agent sends link width support capability information indicating which of the one or more sets of lanes in one link of the pair of the links that are selectable by the second agent for sending information to the first agent.

23. The system defined in claim 20 wherein the first and second agents exchange their link width support capabilities and negotiate the link width in a single round of communication.

24. The system defined in claim 20 wherein the first agent comprises:
   a core;
   a transmitter for communicably coupling to a first agent to send link width capability information indicative of one or more sets of lanes for use by a receiver to receive information from the first agent;

wherein the receiver is operable to receive an indication from the first agent of lanes to use from the one or more sets of lanes; and a link layer controller coupled to the transmitter and the receiver to adjust link width of a link used by the second agent to receive information from the first agent based on the indication.

25. The system defined in claim 20 wherein the second agent comprises:

a core;

a receiver to receive link width capability information from a first agent indicating of one or more sets of lanes of a first link in a point-to-point interconnect by which the first agent is able to receive information;

a link layer controller coupled to the receiver to select one of the sets of lanes for use in transmitting information to the first agent; and a transmitter coupled to the link layer controller to send an indication to the first agent of which of the sets of lanes the first agent is to use to receive information.

26. A system comprising:

a first uni-directional bus having a first pair of a plurality of lanes;

a second uni-directional bus having a second pair of a plurality of lanes;

a first processor agent and second chipset agent coupled to the first pair of the plurality of lanes in the first uni-directional bus, each of the first processor and second agents including a link controller to exchange their link width support capabilities and negotiate a link width that is mutually agreeable for each of the pair of the plurality of lanes based on usability, wherein the link width support capabilities include an indication of lanes of the plurality of lanes that are usable, and wherein the link width support capabilities of the first and second agents include data identifying a set of link widths supported by possible combinations of the lanes coupling the first agent and the second agent, wherein the link width support capability information of each of the first agent and the second agent is determined based on identifying the one or more set of lanes that are usable by assessing quality of each of the lanes, identifying whether a lane of the lanes is usable, and rejecting the lane of the lanes if the lane is not usable, wherein the link width support capability information includes a number of bit fields, wherein each of the number of bit fields indicates which link width of the set of link widths is supported by which combination of a number of the possible combinations of the lanes based on the one or more sets of lanes to perform a link width negotiation process in a single pass; and the first processor agent coupled to the second chipset agent via the second pair of the plurality of lanes in the second uni-directional bus.

27. The system defined in claim 26 wherein the first agent sends link width capability information indicating which of the one or more sets of lanes in one bus of the pair of the buses are selectable by the second chipset agent for sending information to the first processor agent.

* * * * *